Figure 1:
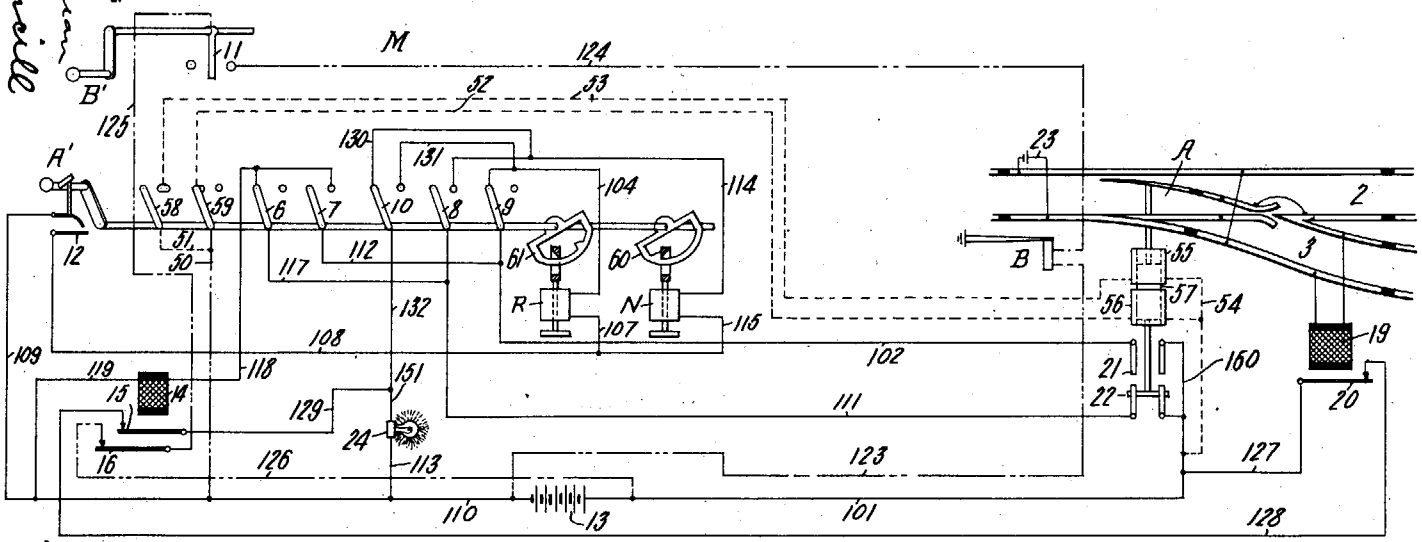

H. W. GRIFFIN.

CONTROLLING APPARATUS FOR RAILWAY SWITCHES AND SIGNALS.

APPLICATION FILED AUG. 22, 1914.

Reissued May 15, 1917. 14,302.

7 SHEETS—SHEET 1.

WITNESSES

W. T. Holman

A. L. Venciill

INVENTOR

Henry W. Griffin

By Geo. E. Lorenz

His Atty.

THE NORRIS PETERS CO., PHOTO-LITHO., WASHINGTON, D. C.

H. W. GRIFFIN.

CONTROLLING APPARATUS FOR RAILWAY SWITCHES AND SIGNALS.

APPLICATION FILED AUG. 22, 1914.

Reissued May 15, 1917.

14,302.

7 SHEETS—SHEET 2.

WITNESSES

W. T. Holman

A. L. Venille

INVENTOR

Henry W. Griffin

By Geo. E. Lemon

His Atty.

THE NORRIS PETERS CO., PHOTO-LITHO., WASHINGTON, D. C.

H. W. GRIFFIN.

CONTROLLING APPARATUS FOR RAILWAY SWITCHES AND SIGNALS.

APPLICATION FILED AUG. 22, 1914.

Reissued May 15, 1917.

14,302.

7 SHEETS—SHEET 3.

WITNESSES

W. T. Holman

A. L. Venrill

INVENTOR

Henry W. Griffin

By Geo. E. Greene

His atty.

THE NORRIS PETERS CO., PHOTO-LITHO., WASHINGTON, D. C.

H. W. GRIFFIN.

CONTROLLING APPARATUS FOR RAILWAY SWITCHES AND SIGNALS.

APPLICATION FILED AUG. 22, 1914.

Reissued May 15, 1917.

14,302.

7 SHEETS—SHEET 4.

WITNESSES

W. T. Holman

A. L. Vencill

INVENTOR

Henry W. Griffin

By Geo. E. Crum

His atty.

THE NORRIS PETERS CO., PHOTO-LITHO., WASHINGTON, D. C.

H. W. GRIFFIN.

CONTROLLING APPARATUS FOR RAILWAY SWITCHES AND SIGNALS.

APPLICATION FILED AUG. 22, 1914.

Reissued May 15, 1917.

14,302.

7 SHEETS—SHEET 5.

WITNESSES

W. T. Hohman

A. L. Veincill

INVENTOR

Henry W. Griffin

By Geo. E. Lemon.

His Atty

THE NORRIS PETERS CO., PHOTO-LITHO., WASHINGTON, D. C.

H. W. GRIFFIN.

CONTROLLING APPARATUS FOR RAILWAY SWITCHES AND SIGNALS.

APPLICATION FILED AUG. 22, 1914.

Reissued May 15, 1917.

14,302.

7 SHEETS—SHEET 6.

WITNESSES

W. T. Holman

A. L. Venrill

INVENTOR

Henry W. Griffin

By Geo. E. Corrin

His Atty.

THE NORRIS PETERS CO., PHOTO-LITHO., WASHINGTON, D. C.

H. W. GRIFFIN.

CONTROLLING APPARATUS FOR RAILWAY SWITCHES AND SIGNALS.

APPLICATION FILED AUG. 22, 1914.

Reissued May 15, 1917.

14,302.

7 SHEETS—SHEET 7.

WITNESSES

W. J. Holman

A. L. Vencill

INVENTOR

Henry W. Griffin

By Geo. E. Lemon

His Atty.

THE NORRIS PETERS CO., PHOTO-LITHO., WASHINGTON, D. C.

UNITED STATES PATENT OFFICE.

HENRY W. GRIFFIN, OF NEW YORK, N. Y., ASSIGNOR TO THE UNION SWITCH AND SIGNAL COMPANY, OF SWISSVALE, PENNSYLVANIA, A CORPORATION OF PENNSYLVANIA.

CONTROLLING APPARATUS FOR RAILWAY SWITCHES AND SIGNALS.

14,302. Specification of Reissued Letters Patent. Reissued May 15, 1917.

Original No. 1,033,243, dated July 23, 1912, Serial No. 535,620, filed December 30, 1909. Application for reissue filed August 22, 1914. Serial No. 858,126.

*To all whom it may concern:*

Be it known that I, HENRY W. GRIFFIN, a citizen of the United States, residing in the borough of Manhattan, city, county, and State of New York, have invented certain new and useful Improvements in Controlling Apparatus for Railway Switches and Signals, of which the following is a specification.

My invention relates to circuits for the control of railway switches and signals, and has for an object an arrangement of circuits and apparatus for insuring that a switch has completed its movement in response to the movement of its controlling or operating lever before a signal governing traffic over said switch can be moved to its "proceed" position.

One important feature of my invention is that the signal will be immediately returned to the danger position if either the switch or its controlling lever is moved after the signal has been cleared, as for example, if the switch is moved by hand.

My invention is particularly adaptable to the controlling circuits for "electro-pneumatic" and "electric" systems of switch and signal operation.

Heretofore, in power signaling, it has often been the practice to carry the signal control wires through circuit controllers operated directly by the switches over which the signal governs traffic. This has only been practicable, however, with important main line signals governing high speed routes, on account of the great cost of wire, shelter for wire, and switch circuit controllers; thus leaving the less important signals dependent only upon the interlocking machine. And when it has been done, false clear signals have sometimes developed owing to the immense amount of wire, and the switch circuit controllers, and their exposure to bad weather conditions. By the use of my invention, these uncertain protective devices are displaced by reliable relays which can be located within the interlocking cabin, and by circuit controllers operated by the machine. These new devices are not subject to bad weather conditions, and they can be easily inspected. Other advantages are a material reduction in cost, the securing of a lamp or other indication immediately upon the derangement of a switch, and also a simple and inexpensive safety control of the low speed or less important signals.

I will describe arrangements of circuits and apparatus embodying my invention, and then point out the novel features thereof in claims.

Figure 2:
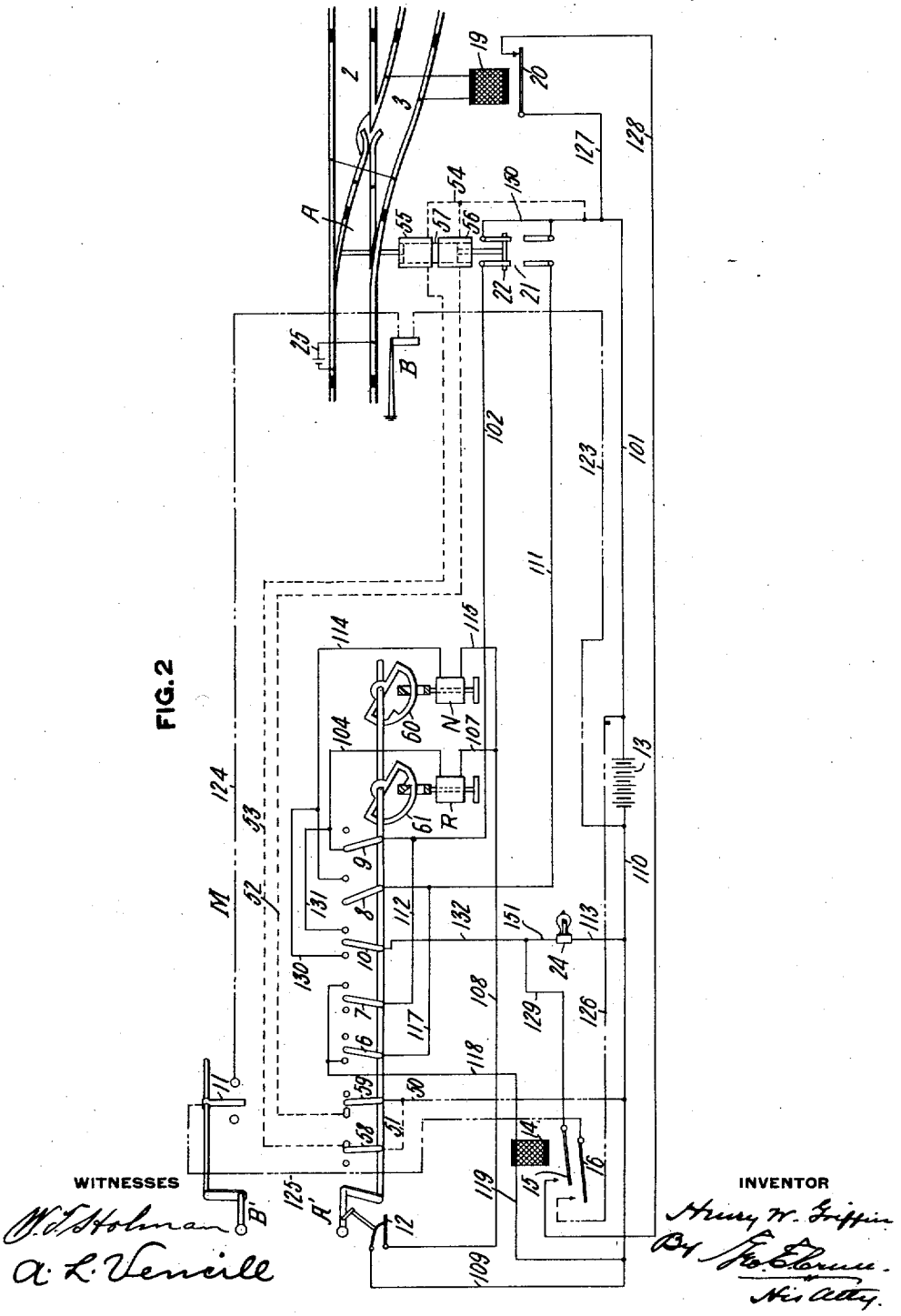
Figure 3:
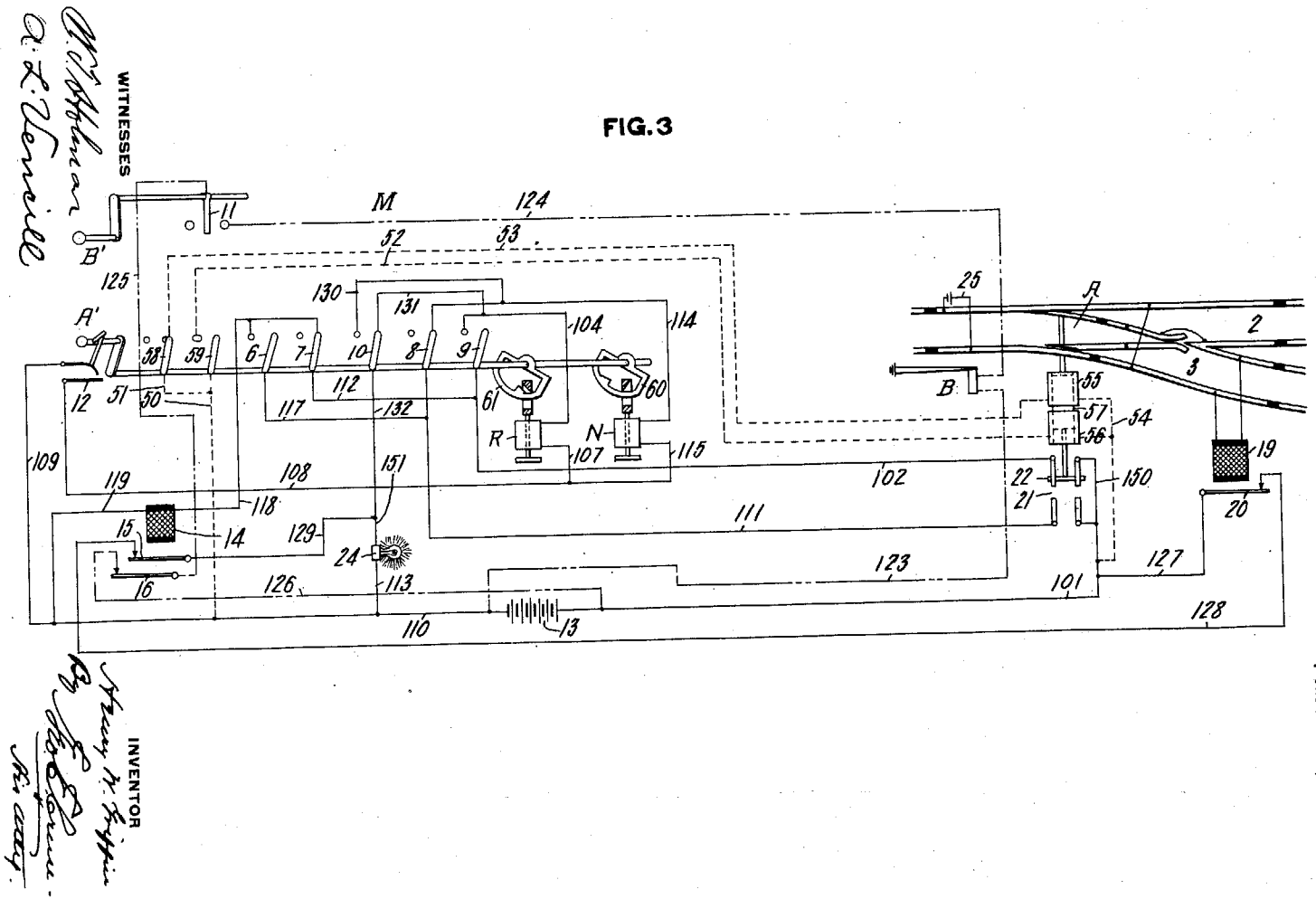
Figure 4:
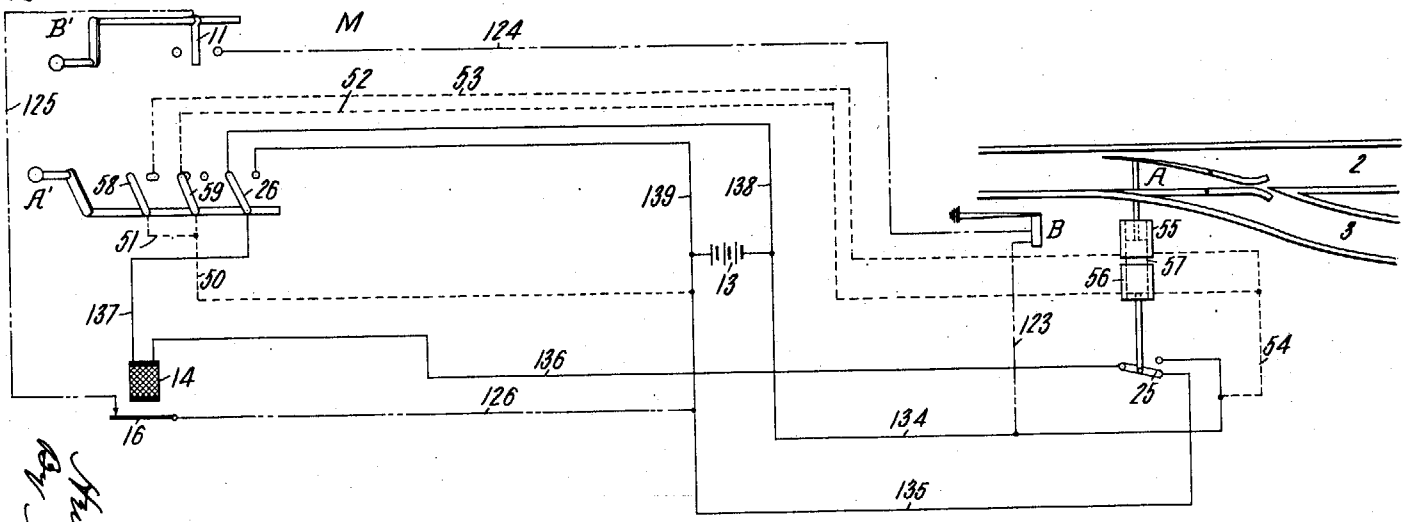
Figure 5:
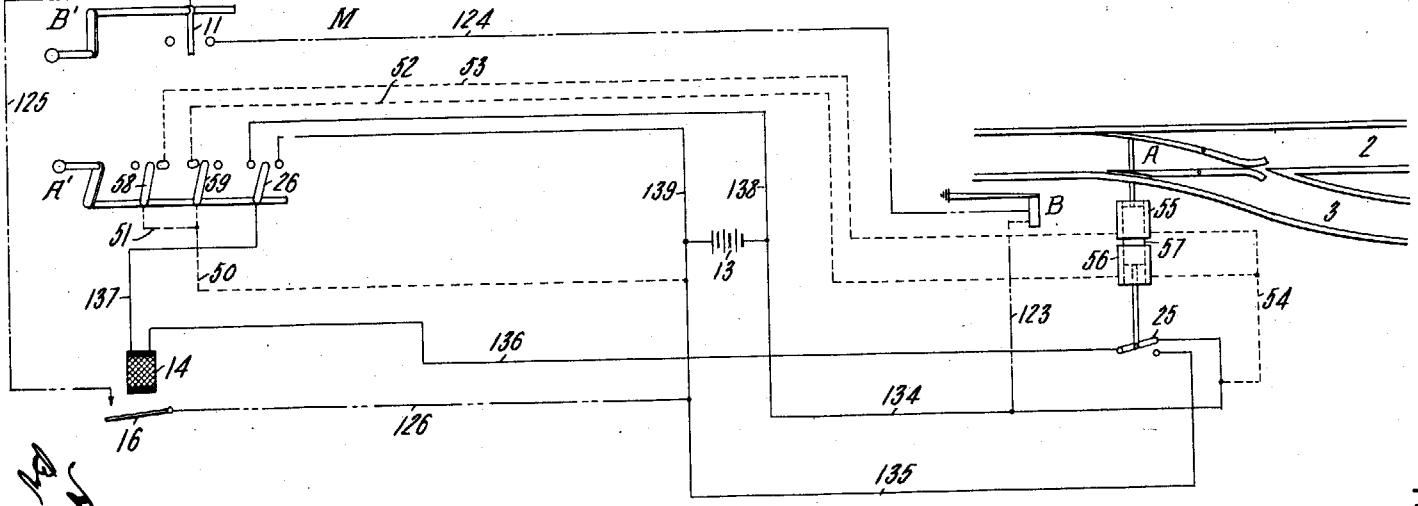
Figure 6:
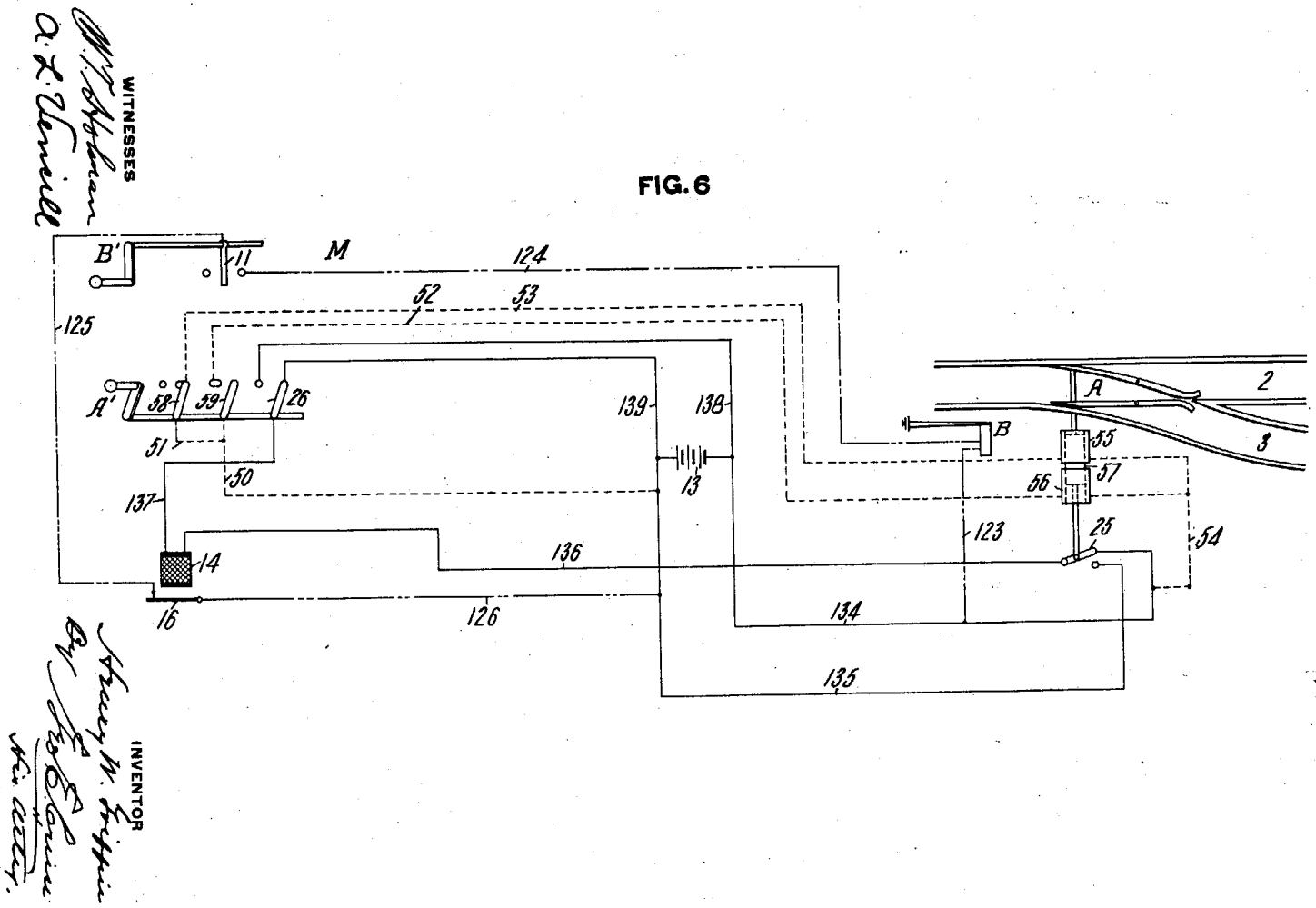
Figure 7:
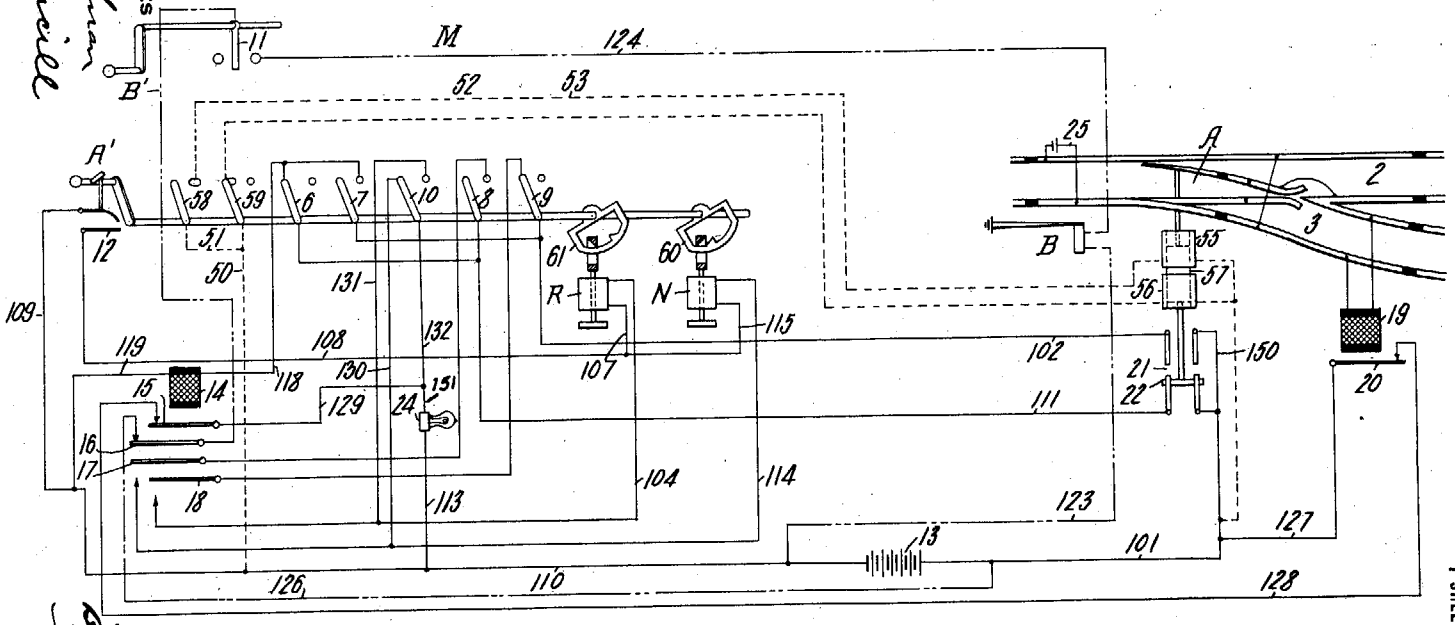

In the accompanying drawings, Figure 1 is a diagrammatic view showing an arrangement of circuits adaptable to the electric or electro-pneumatic system of control of switches and signals, and embodying my invention. Figs. 2 and 3 are views similar to Fig. 1, but showing the changes in position of the various parts during the movement of a switch. Fig. 4 is a diagrammatic view showing a modification of my invention adaptable to the electric or electro-pneumatic system of control of switches and signals. Figs. 5 and 6 are views similar to Fig. 4 but showing the changes in position of the various parts during the movement of a switch. Fig. 7 is a view showing a modification of the system of Fig. 1.

Similar reference characters designate similar parts throughout the several views.

Referring to Figs. 1, 2 and 3 the reference character 2 designates a section of straight track from which a switch A leads to a branch track 3. A signal B governs traffic over switch A. The letter M designates an "interlocking machine," comprising a lever A′ which controls the switch A, and a lever B′ which controls the signal B. Several electric circuit controllers operated by the lever A′ are diagrammatically represented by movable contact pieces 6, 7, 8, 9 and 10, 58 and 59. A circuit controller operated by the signal lever B′ is represented diagrammatically by a movable contact piece 11. A circuit controller or "switch indication controller" 21 is operated by the movement of the switch A in a manner well known in the art. Two magnets, designated as N and R, whose circuits are controlled by the switch indication controller 21, permit the switch operating lever to complete its movement when the switch A has made a complete stroke in one direction or the other. For instance, the normal indication magnet N is energized when the switch has completed its stroke to the normal position, thereby permitting the controlling lever A′ to be moved to the extreme limit of its stroke. This latter movement unlocks on the machine all levers the movement of which would not interfere with the new position of the switch A. These indication circuits as heretofore used and the apparatus used in connection therewith, as well as the power circuits are fully shown and described in Letters Patent No. 551,755 granted to J. P. Coleman on December 24, 1895. These "indication" magnets N and R may also be used as lock magnets controlled by a track circuit to lock the controlling lever A′ in its extreme position in case of a car being near the switch A. For this purpose the magnets N and R are energized by a circuit passing through an armature contact on a track relay 19, as more fully described hereinafter. This track relay 19 and its track circuit, as well as the locking circuits controlled thereby, are not essential features of a system embodying my invention, as the invention may be applied equally well to a system in which any suitable means are employed to prevent a movement of a switch controlling lever when the rails adjacent the switch are occupied by a car or train. 12 designates a circuit controller operated by the latch handle on the lever A′, in a manner well known in the art. The movements of the switch A are accomplished by means of any suitable motor device, here shown as being two solenoids 55 and 56 which move a plunger 57 in one direction or the other according to which solenoid is energized. The circuits for these solenoids are controlled by contacts 58 and 59 on the lever A′, and these circuits are shown in short dash lines. The circuit for solenoid 55 is from battery 13 through wires 110, 50 and 51, contact 58, wire 53, solenoid 55, wires 54 and 101 to battery. The circuit for solenoid 56 is similar, and need not be traced in detail. A relay magnet 14 which may be located near the interlocking machine, is connected in a branch of the indication circuits. The use of this relay in connection with the associated apparatus herein described, constitutes my present invention. This relay 14 is, with the parts in the positions shown in Fig. 1, energized by a circuit which may be traced as follows: from battery 13 through wire 101, bridge 22 of indication box 21, wires 111 and 117, contact 6, wire 118, relay 14, wires 119 and 110 to battery 13. On account of the armature of relay 14 being in a closed position, it is possible to move the signal B to its clear position by turning its controlling lever B′ to the right, thus closing a circuit as follows: from battery 13 through wire 123, signal B, wire 124, contact 11 on controlling lever B′, wire 125, armature 16 of relay 14, wire 126 to battery 13. This circuit is shown in long and short dash lines on the drawings. Therefore, with the switch controlling lever A′ and the switch A both in their normal position, it is possible to move the signal B to its clear position.

I will now trace the release and indication circuits for a complete movement of the controlling lever A′ and the switch A, reference being had first to Fig. 1 which shows all parts of the indication circuits and apparatus in normal position. Assuming that there is no car within the limits of the track detector circuit, the relay 19 is energized as shown. Upon closing the circuit controller 12 by means of the handle latch on lever A′, a circuit is completed as follows: from battery 13 through wires 101 and 127, armature 20 of relay 19, wire 128, armature 15 of relay 14, wires 129 and 132, contact 10 operated by lever A′, wires 130 and 114, normal indication magnet N, wires 115 and 108, circuit controller 12, wires 109 and 110 to battery 13. The normal indication magnet being thereby energized, the switch operating lever A′ is released by means of the well known latch device, and it can be moved to the operating position shown in Fig. 2. With the lever A′ in this position the switch operating circuit through solenoid 55 will be closed to cause a "reverse" movement of the switch A. Upon the completion of this movement and after the locking of the switch in its new position, the circuit controlling bridge 22 in the switch indication box 21 will have moved to the position shown in Fig. 2. The controlling lever A′ is now ready for a release to permit of its completing its movement to the reverse position, and upon closing the latch circuit controller 12 the release or indication circuit is closed as follows: from battery 13 through wires 101 and 150, bridge 22 of indication box 21, wire 102, contact 9, wire 104, indication magnet R, wires 107 and 108, circuit controller 12, wires 109 and 110 to battery 13. The reverse indication magnet R being thereby energized, the controlling lever A′ is released and allowed to complete its movement to the position shown in Fig. 3. The signal B can now be cleared by moving its controlling lever B′ to the right, the signal circuit being the same as hereinbefore traced. Referring to Fig. 2, it will be noted that until the controlling lever A′ has completed its movement, the relay 14 remains deënergized owing to the break in its circuit at the contact 7. With the relay 14 thus deenergized and its armature contact 16 therefore open, it would be impossible to close the circuit for signal B as heretofore described, and the signal is therefore held in its danger or stop position. Furthermore, it is impossible to complete the movement of the switch controlling lever until the switch has completed its stroke owing to the fact that the release or indication circuit described above cannot until then be closed. Therefore, by the use of the relay 14 in connection with the indication system as heretofore used, I accomplish the important object of my invention, viz., to insure that the switch A shall have completed its movement in response to a movement of the controlling lever A′ before the signal B governing traffic over the switch can be moved to "proceed" position. It will be noted that in case the controlling lever A′ and the rails of switch A are not in corresponding positions the circuit through the relay 14 will be broken at either contact 6 or 7 according to the position of the controlling lever, and this circuit cannot be again completed until either the switch or the controlling lever has been moved to make their positions correspond. I have thus avoided the possibility of giving a clear or "proceed" signal for traffic over a misplaced switch; that is, if the switch should be moved independently of the switch controlling lever after the signal has been cleared, the circuit for relay 14 would be opened so that the signal would at once return to danger.

An indicating device 24 may be connected with the locking circuit in such manner as to indicate to an operator whether or not tracks 2 or 3 within the limits of the track circuit are occupied. This indicating device is here shown as being an incandescent lamp, although any other form of indicator, such for instance as an electromagnetic device, may be used equally well. This use of the lamp is not new, but when used in connection with the relay and circuits of my invention it serves the additional function of indicating to the operator at a glance when a switch has become misplaced with respect to its controlling lever. Referring to Fig. 1 it will be seen that this lamp is here illuminated, its circuit being as follows: from battery 13 through wires 101 and 127, armature 20 of track relay 19, wire 128, armature 15 of relay 14, wires 129 and 151, lamp 24, wires 113 and 110 to battery 13. Thus as long as the track relay 19 is energized the lamp 24 will be illuminated, but upon the entrance of a train upon the section of rails protected by the track circuit the track relay 19 will be deënergized and the lamp extinguished. Also, in case of the misplacement of the switch A with respect to its controlling lever A′, the relay 14 will be deenergized as hereinbefore explained, and since the lamp circuit passes through armature contact 15 of this relay, the lamp will be at once extinguished.

Referring now to Fig. 7, I here show a modification of the circuits of Figs. 1, 2 and 3 which may at times be desirable. Instead of carrying the indication wires directly from movable contacts 8 and 9 to the magnets N and R, I here show them as passing through back contacts 17 and 18 of relay 14. This may be used as a precautionary feature for insuring that the relay has released before the lever can complete its stroke.

Referring now to Figs. 4, 5 and 6, I have here shown a modification of my invention which is adaptable to either the "electric" or the "electro-pneumatic" system of control of switches and signals. It is particularly adaptable for any system in which it is not advisable or possible to use the indication wires and indication controller on the switch, and involves the use of one additional wire 136 between the switch and its controlling lever. The switch A operates a circuit controller 25, here shown as being a movable contact piece. A similar contact piece 26 is operated by the lever A′ on the controlling machines. The protecting relay 14 is connected in a circuit which includes these two circuit controllers, in such manner that the controllers must be in certain relative positions before the relay will be energized. Referring to Fig. 4, in which all parts are shown in "normal" position, the relay circuit is as follows: from battery 13 through wire 135, contact piece 25, wire 136, relay 14, wire 137, contact piece 26, wire 138 to battery 13. The relay 14 being thereby energized, the controlling circuit for signal B may be closed by moving the controlling lever B′ to the right, this circuit being as follows: from battery 13 through wires 135 and 126, armature 16 of relay 14, wire 125 contact piece 11 on controlling lever B′, wire 124, signal B, wires 123 and 134 to battery 13. The wires which are peculiar to this circuit are shown in long and short dash lines. When the controlling lever A′ is moved to cause a "reverse" movement of the switch A, the parts assume the positions shown in Fig. 5. The switch is here shown as having completed its reverse movement, but the indication not having as yet been received, the controlling lever has not completed its stroke. The circuit through the relay 14 is therefore open at the contact piece 26, and, the relay being therefore deenergized, the signal circuit cannot be closed. After receiving the indication (the means for which are not shown here) the controlling lever may be moved to the limit of its stroke and the parts will assume the positions shown in Fig. 6. Here it will be seen that the circuit is again closed through the relay 14, thus permitting the circuit for signal B to be closed through the armature 16. Hence it is evident that, as in the case of the electro-pneumatic system hereinbefore described, it is essential for a switch and its controlling lever to be in the proper relative positions before a signal governing traffic over the switch can be moved to "proceed" position, and any derangement of the switch from the position corresponding to the position of its controlling lever will prevent the clearing of the signal, or will return the signal to danger if it has already been cleared.

It will be seen from the foregoing descriptions that in the practice of my invention I provide a relay in connection with a circuit controller operated by the switch and a circuit controller operated by the switch controlling lever. I use this relay to control the operation of a signal or signals governing traffic over the switch. As a means of controlling the signal I here show the signal controlling circuit as passing through an armature contact on the relay, although I do not wish to limit myself to this particular method of control, as any means may be used whereby the relay will prevent the signal from being cleared when the switch controlling lever and the switch are not in proper relative positions, and whereby the signal will be immediately returned to danger position if either the switch or its controlling lever is moved after the signal has been cleared.

When "indication" wires already exist, as in the electro-pneumatic system, I have shown it to be practicable to use these wires as portions of the circuit for my additional relay 14. The use of these wires is merely an economical measure, avoiding the necessity of additional wiring between the switches and the interlocking machine. In cases where the indication wires are not available, one additional wire may be used instead, as hereinbefore described.

Although I have here shown the application of my invention to comparatively simple circuits for operation and indication, I do not wish to be limited to these circuits, for the invention may be applied to more complicated systems without departing from the spirit and scope of my invention. For example, I have here shown but one signal governing traffic over a switch, whereas in the actual practice there will in general be a plurality of signals for each direction of traffic, all being controlled by one lever, selection being made by methods well known in the art. Again, I have here shown but one switch over which a signal governs traffic, but there may equally well be a plurality of successive switches, all of which must be in the proper positions relative to their controlling levers before a signal governing traffic over them can be cleared.

Although I have here shown my invention as applied only to systems of "power interlocking," it is equally applicable to "mechanical interlocking plants." In the latter case, a system similar to that illustrated in Figs. 4, 5 and 6 may be used, a circuit controller being operated by each switch and another circuit controller operated by each switch controlling lever. The relay 14 may then control in any suitable manner each signal governing traffic over the switches thus protected so that in case of derangement of a switch with relation to its controlling lever the signal cannot be cleared, or will be returned to danger if it has already been cleared; in case of power signals being used, the signal controlling circuit may be broken through an armature contact on the relay as shown in the accompanying drawings.

Having thus described my invention, what I claim is:

1. In combination, a railway switch capable of normal and reverse positions, a controlling lever therefor capable of normal and reverse positions corresponding to the positions of the switch, a circuit controller operatively connected with the switch and a circuit controller operated by the lever, a relay, a circuit for said relay including the two said circuit controllers, which circuit is closed only when the switch and the lever are both in normal or both in reverse positions, a signal governing traffic over said switch, and means for continuously controlling said signal by the relay whereby the signal cannot be cleared unless the switch and the lever are in corresponding extreme positions, and whereby the signal will be returned to its danger indication if either the switch or the lever is moved after the signal has been cleared.

2. In combination, a railway switch capable of normal and reverse positions, a controlling lever therefor capable of normal and reverse positions corresponding to the positions of the switch, a circuit controller operatively connected with the switch and a circuit controller operated by the lever, a circuit including said circuit controllers which circuit is closed only when the switch and the controlling lever are both in normal or both in reverse positions, and a signal governing traffic over said switch and continuously controlled by said circuit whereby the signal cannot be cleared unless the switch and the lever are in corresponding extreme positions, and whereby the signal will be returned to its danger indication if either the switch or the lever is moved after the signal has been cleared.

3. In combination, a railway switch capable of normal and reverse positions, a controlling lever for said switch capable also of normal and reverse positions corresponding to the positions of the switch, a common wire and two other conductors extending between the switch and the controlling lever, means controlled by the switch for connecting one end of the common wire with one of said conductors or the other according as the switch is in normal or reverse position, means controlled by the lever for connecting the other end of the common wire with one of said conductors or the other according as the lever is in normal or reverse position, the two ends of the common wire being connected with the same conductor when the switch and the lever occupy corresponding positions, a source of current included in said common wire, a signal governing traffic over said switch, and means included in said common wire for continuously controlling said signal whereby the signal cannot be cleared unless the switch and the lever are in corresponding extreme positions, and whereby the signal will be returned to its danger indication if either the switch or the lever is moved after the signal has been cleared.

4. In combination, a railway switch capable of normal and reverse positions, a controlling lever for said switch capable also of normal and reverse positions corresponding to the positions of the switch, a common wire and two other conductors extending between the switch and the controlling lever, means controlled by the switch for connecting one end of the common wire with one of said conductors or the other according as the switch is in normal or reverse position, means controlled by the lever for connecting the other end of the common wire with one of said conductors or the other according as the lever is in normal or reverse position, the two ends of the common wire being connected with different conductors when the switch and the lever are in corresponding positions, a source of current connected between said two conductors, a signal governing traffic over the switch, and means included in said common wire for controlling said signal.

5. In combination, a railway switch, a lever for the control thereof, indication means for governing said lever, circuits for said indication means, circuit controlling contacts operatively connected with said switch for controlling said circuits, translating means, circuits for said translating means including said switch controlled contacts and portions of the circuits for the indication means and contacts operated by said lever, said circuits requiring that the switch and the lever coincide in extreme positions to energize the translating means, a signal governing traffic over said switch, and means for controlling said signal by said translating means.

6. In combination, a railway switch, an interlocking machine comprising a lever for controlling said switch, indication means for governing said lever, circuits for said indication means, circuit controlling contacts operatively connected with said switch for controlling said circuits, translating means, circuits for said translating means including said switch contacts and portions of said indication circuits and contacts actuated by said lever, said circuits requiring that the switch and the lever coincide in extreme positions to energize the translating means, a signal governing traffic over said switch, a lever comprised also in said interlocking machine for controlling said signal, and means for also controlling said signal by said translating means.

7. In combination, a railway switch, an interlocking machine comprising a lever for the control of said switch, means for actuating said switch in response to partial movements of the lever, electrically controlled indication means for governing said lever, circuits for said indication means, circuit controlling contacts operatively connected with said switch for controlling said circuits to cause operation of said indication means to allow completion of the movement of the lever when the switch has fully responded to the partial movement of the lever, translating means, circuits for said translating means including said switch contacts and portions of said indication circuits and contacts actuated by said lever, said circuits requiring that the movement of the lever shall be completed to fully coincide in extreme position with the new position of the switch before the translating means can be energized, a signal governing traffic over said switch, a lever comprised also in said interlocking machine for controlling said signal, and means for also controlling said signal by said translating means.

8. In combination, a railway switch, an interlocking machine comprising a lever for the control of said switch, means for actuating said switch in response to partial movements of the lever, two electric locks for said lever one for preventing completion of the movement of the lever in each direction, a circuit for each lock, circuit controlling contacts operatively connected with the switch for closing one or the other of said lock circuits when the switch has completed its movement in response to the partial movement of the lever, translating means, circuits for said translating means including said switch contacts and portions of said lock circuits and contacts actuated by said lever, said circuits requiring that the movement of the lever shall be completed to fully coincide in extreme position with the new position of the switch before the translating means can be energized, a signal governing traffic over said switch, a lever comprised also in said interlocking machine for controlling said signal, and means for also controlling said signal by said translating means.

9. In combination, a railway switch, an interlocking machine comprising a lever for the control of said switch, means for actuating said switch in response to partial movements of the lever, two electric locks for said lever, one for preventing completion of the movement of the lever in each direction, a circuit for each lock, circuit controlling contacts operatively connected with the switch for closing one or the other of said lock circuits when the switch has completed its movement in response to the partial movement of the lever, a circuit controller operated by the lever for preventing closure of each lock circuit except when the lever occupies the partially completed position of movement from which it is to be released by the corresponding lock, a relay, a circuit therefor including said switch operated contacts and portions of the lock circuits and contacts actuated by the lever, said relay circuit requiring that the movement of the lever be completed to correspond to the new position of the switch before the relay can be energized, a signal governing traffic over said switch, a second lever comprised in said interlocking machine for controlling said signal, and means for also controlling said signal by said relay.

10. In combination, a railway switch, an interlocking machine comprising a lever for the control of said switch, means for actuating said switch in response to partial movements of the lever, two electric locks for said lever, one for preventing completion of the movement of the lever in each direction, a circuit for each lock, a circuit controller operatively connected with the switch for closing one or the other of said lock circuits when the switch has completed its movement in response to the partial movement of the lever, translating means, means operated by the lever upon the completion of a movement thereof for disconnecting from its circuit the lock which was energized to release the lever and connecting said translating means in the last-mentioned circuit, a signal governing traffic over said switch, a second lever comprised in said interlocking machine for controlling said signal, and means for also controlling said signal by said translating means.

11. In combination, a railway switch, an interlocking machine comprising a lever for controlling said switch, means for actuating the switch in response to partial movements of said lever, two electrically controlled locks for said lever one for preventing completion of the movement of the lever in one direction and the other for preventing completion of the lever in the other direction, circuits for said locks comprising a common wire and two individual wires one for each lock, circuit controlling contacts operatively connected with the switch for energizing one or the other of said lock circuits when the switch has completed its movement in response to the partial movement of the lever, translating means; circuits for said translating means comprising said common return wire, said switch actuated contacts, portions of said two individual wires and contacts operated by said lever, said circuits requiring that the switch and the lever occupy coincident extreme positions to energize the translating means; a signal governing traffic over said switch, a second lever comprised in said interlocking machine for controlling said signal, and means for controlling said signal by said translating means.

12. In combination, a railway switch, an interlocking machine comprising a lever for said switch, means for actuating said switch in response to partial movements of said lever, circuit controlling contacts one or another of which is closed according as the switch occupies one extreme position or the other, indication means controlled by said contacts for governing the movements of said lever, contacts actuated by said switch controlling lever, a signal governing traffic over said switch, a second lever comprised in said interlocking machine for controlling said signal, and means for also controlling said signal by said first mentioned contacts and by said second mentioned contacts, said two groups of contacts requiring that the switch and its controlling lever coincide in extreme positions in order that the signal may indicate clear.

In testimony whereof I affix my signature in presence of two witnesses.

HENRY W. GRIFFIN.

Witnesses:
J. J. Cozzens,
M. S. Kirkland.

Copies of this patent may be obtained for five cents each, by addressing the "Commissioner of Patents, Washington, D. C."